April 16, 1968  V. NAVE  3,377,807
ANCHOR BOLT ASSEMBLY
Filed June 15, 1966
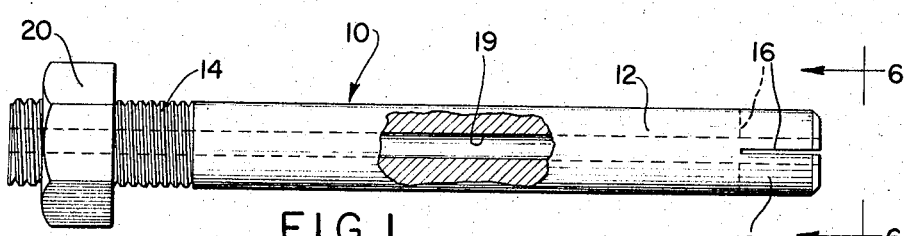
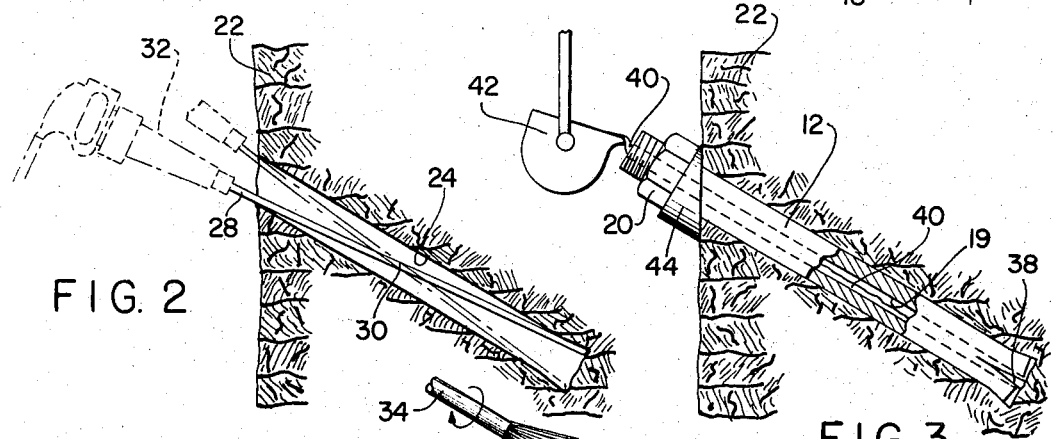
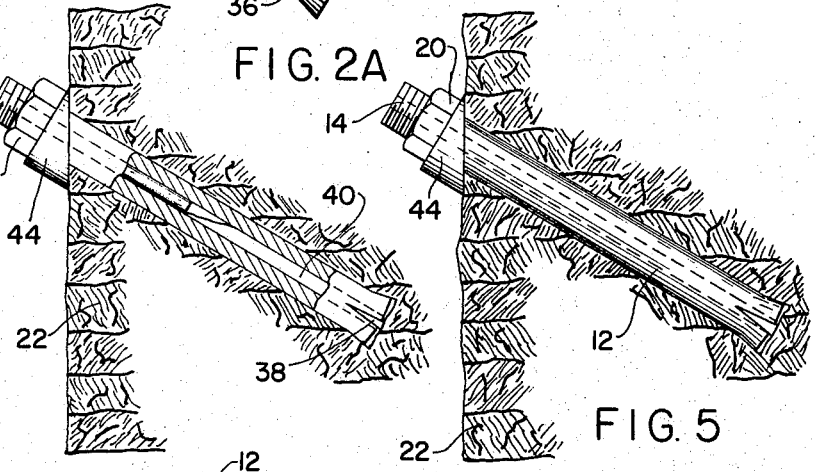
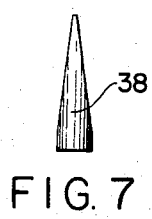
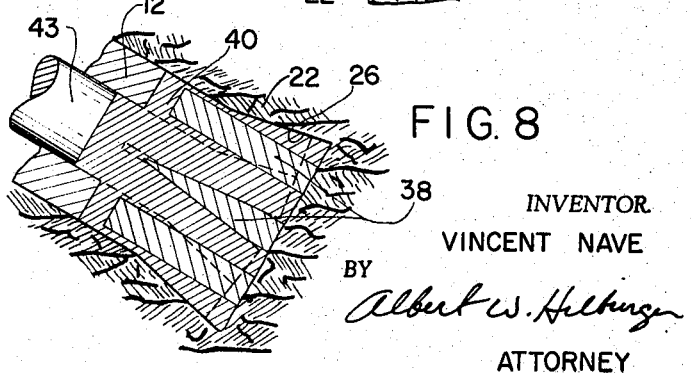
INVENTOR.
VINCENT NAVE
BY
*Albert W. Hilburger*
ATTORNEY

United States Patent Office 3,377,807
Patented Apr. 16, 1968

3,377,807
ANCHOR BOLT ASSEMBLY
Vincent Nave, 20 Bennett St., N. Providence, R.I. 02904
Filed June 15, 1966, Ser. No. 557,819
2 Claims. (Cl. 61—45)

ABSTRACT OF THE DISCLOSURE

An anchor bolt assembly mounted in a hole extending into a supporting structure and terminating at an enlarged cavity, and a method of constructing the anchor bolt assembly. A bolt having a longitudinally extending bore and an expansible end portion is driven into the hole so that the end portion snugly engages the cavity. The cavity is provided with a filler material admitted through the bore and the bore is provided with a reinforcing member abutting the filler material and having substantially the same diameter as the bore.

---

My invention relates to an improved anchor bolt assembly for supporting heavy pulsating loads and to a method of constructing the fastener.

It is often necessary and indeed desirable in the construction of bridges, roads, and the like to employ rock as the supporting medium. However, heretofore, it was often difficult to achieve a substantial connection between the rock, particularly dense rock such as granite, and the structure being erected. This was particularly true when the structural loads were of a dynamic variety, as, for example, a lift bridge. Many of the fasteners of the prior art were fully acceptable under static loading conditions but soon became loosened under dynamic loading conditions requiring their early replacement. Hence, in the past, continual maintenance was necessary lest failure of one or more fasteners jeopardize the structure being supported.

The fasteners of the prior art were of many different constructions, but generally relied upon the frictional or wedging force between expanded portions thereof and the sidewalls of the hole formed in the rock or other supporting structure. Certain embodiments of known fasteners called for forming the hole so that it had a substantially larger diameter along its entire length than that of the bolt to be inserted therein, and in some instances the annular space between bolt and hole was filled with mortar or other filler material.

My invention is an improvement over these known constructions. To this end, the shank of a bolt having a longitudinally extending bore therein has an outside diameter substantially the same as that of the hole into which it is inserted. The bottom of the hole is enlarged to form a cavity having a diameter which is greater than the other regions thereof. A plurality of longitudinally extending grooves are formed in the base end of the bolt. Wedges are receivable in said grooves so that the sides of the bolt are expanded against the enlarged sidewall of the cavity as the bolt is driven therein. When the bolt has been driven into the hole to the maximum extent and the sides of the bolt at the base end thereof are fully engaged by the sidewalls of the cavity, a filler material is poured or forced under pressure via the bore into the cavity at the base of the hole. Upon solidification of the filler material, the bolt is held rigidly in place so that not even a dynamic or pulsating load possesses the ability to loosen it. For further rigidity, and particularly to improve the quality of shear strength, a rod having substantially the same diameter as the bore of the bolt is driven into the bolt, and the excess length suitably removed. With a threaded head end extending outwardly from the hole and a nut receivable thereon, the bolt is ready for use.

Accordingly, an object of my invention is to provide a new and improved anchor bolt assembly.

Another object of my invention is to provide a new and improved anchor bolt assembly wherein the bottom of the bolt receiving hole is formed with a cavity which is substantially larger than the remaining portions thereof.

Still another object of my invention is the provision of a new and improved anchor bolt having a longitudinally extending bore therein and a plurality of longitudinally disposed grooves formed adjacent the base of the bolt so that wedges received therein expand the bolt against the sidewalls of a hole having an enlarged cavity at the bottom thereof when the bolt is driven therein.

Yet another object of my invention is to provide a new and improved anchor bolt having a longitudinally extending bore formed therein, and a reinforcing rod receivable therein.

Still a further object of my invention is to provide a new and improved method of constructing an anchor bolt assembly.

Yet a further object of my invention is to provide a new and improved method of constructing an anchor assembly which comprises the steps of drilling an elongated hole in a supporting structure of a diameter substantially the same as that of a hollow bolt receivable therein, enlarging the bottom of the hole, and expanding the base end of the bolt against the enlarged bottom of the hole.

Still another object of my invention is to provide a new and improved method of constructing an anchor assembly comprising the steps of driving a hollow bolt into a supporting structure having substantially the same diameter as that of a hollow bolt receivable therein, expanding the base end of the bolt against an enlarged cavity at the bottom of the hole, supplying a filler material into the bottom of the hole, and inserting a reinforcing member into said bolt.

Other and further objects will be apparent from the description which follows, taken together with the drawings in which like numerals refer to like elements throughout.

In the drawings:

FIGURE 1 is a side elevation view, partially cut away, illustrating the novel anchor bolt disclosed herein;

FIGURE 2 is a side elevation, in section, illustrating a typical procedure for enlarging the bottom of the anchor-receiving hole;

FIGURE 2A is a detail showing of an enlarging tool somewhat modified from that illustrated in FIGURE 2;

FIGURE 3 is a side view, in section, illustrating a typical procedure of supplying a filler material to the bottom of the hole;

FIGURE 4 is a side view, in section, illustrating the procedure of inserting a reinforcing rod into the bore of the anchor bolt;

FIGURE 5 is a side view, in section, of the anchor bolt ready for use;

FIGURE 6 is an end view of the anchor bolt;

FIGURE 7 is a side elevation view of a wedge receivable within the slots of the anchor bolt; and FIGURE 8 is a detail view, in section, of the bottom of the hole and the base of the anchor bolt conforming therewith.

Referring now more particularly to the drawings, an anchor bolt is shown in FIGURE 1 generally at 10. The bolt 10 comprises a shank portion 12, a threaded head end 14, and a base end into which a plurality of longitudinally extending radial slots 16 (see FIGURE 6) have been formed defining flukes 18. Also formed in bolt 10 is a longitudinal bore 19 extending the length thereof. A nut 20 is receivable on the threaded head end 14 in the normal manner. Of course, it will be appreciated that other forms of connecting means may be employed in place of the threaded head end 14 and nut 20 without affecting the value of the instant invention.

In the procedure for applying the anchor bolt 10 to a supporting structure 22, which may be a dense rock material such as granite or a man-made material such as concrete, an initial step calls for drilling or otherwise forming an elongated hole 24 therein in any suitable manner. The diameter of the hole 24 is chosen to be substantially that of the outer diameter of the anchor bolt 10. The hole 24 may even be slightly smaller than that of said anchor bolt to assure a snug fit. Thereafter, the bottommost regions of hole 24 are enlarged to form a cavity 26 as most clearly seen in FIGURE 8.

This operation may be performed by rocking a drill shank 28 having a considerably smaller diameter than hole 24 about an imaginary pivot point 30. In this example, a reciprocating motion is imparted to the drill shank 28 by means of a jack hammer 32. Another method of enlarging bottom cavity 26 might reside in rotating a drill bit 34 (see FIGURE 2A) having an enlarged cutting element 36 at its extreme tip. Thus, the cutting element 36 could carve the enlarged bottom cavity 26 without regard for the ratio of length to diameter of the hole. In explanation, it will be appreciated that the longer the hole relative to its diameter, the smaller the arc through which drill shank 28 (see FIGURE 2) can be rotated, and therefore the smaller the diameter of enlarged bottom cavity 26. Hence the use of drill bit 34 with the cutting element 36 would be preferable when the hole 24 is especially long relative to its diameter.

Following the formation of the hole 24 and its enlarged bottom cavity 26, wedges 38 (see FIGURE 7) are tapped lightly into engagement with each of the slots 16, so that the longitudinal axes of the wedges are substantially aligned with the corresponding axes of the slots. Thereupon, the bolt 10 with the attached wedges is driven into the hole 24. The wedges 38 are first to reach the bottom of the hole 24. Continued driving of the bolt 10 forces wedges 38 higher and higher into their associated slots 16, expanding the flukes 18 at the base end thereof into the enlarged bottom cavity 26.

When the bolt 10 reaches its maximum possible depth, it is desirable to further ensure its holding properties by supplying the cavity 26 with a filler material 40. A preferable filler material 40 would be molten lead which is illustrated in FIGURE 3 being poured by means of a ladle 42 into the bore 19, from whence it flows into cavity 26. Lead is preferable because it flows easily, seeking out all hollow places whereupon it rapidly solidifies. However, any other suitable filler material may be used including cement or the like, with the appropriate supplying means being employed in each instance.

To further improve the shear strength of anchor bolt 10, a rod 43 having a diameter substantially equal to that of the bore 19 or preferably even slightly larger than that of bore 19 in the manner of an interference fit is suitably driven therein until the filler material 40 restricts its further movement. This operation also serves to compact the filler material, should this be possible. Any excess length of rod 42 beyond the end of bolt 10 is suitably removed. Anchor bolt 10 is thereupon ready for service and can receive thereon an angle washer 44. Resting on the latter is shown a flange 46 of the structure to be supported. Nut 20 received on threaded portion 14 is snugged down to engage flange 46, securing same in place against angle washer 44.

I have now disclosed an improved anchor bolt construction which is of particular value for supporting structures subject to heavy loading and especially subject to dynamic or pulsating loading. The base of my anchor bolt is expanded against an enlarged cavity formed in the bottom of the hole formed in the supporting rock such that its removal is virtually impossible. Furthermore, because the diameter of the hole is substantially that of the anchor bolt, the latter is not subject to wobble or to oscillatory movements therewithin which would tend to loosen the grip of said bolt. Then too, my invention is inexpensively manufactured, and can be readily applied.

In this disclosure, there is shown only the preferred embodiment of my invention. However, it will be recognized that my invention is capable of other and different embodiments and that its several details may be modified in various ways, all without departing from the invention as defined in the appended claims. Accordingly, the drawings and description herein are to be considered as merely illustrative in nature and not as restrictive.

What is claimed is:

1. An anchor bolt assembly comprising: a supporting structure having a preformed hole extending therein and terminating at an enlarged cavity, a bolt in said hole having a longitudinally extending bore, said bolt having substantially the same diameter as said hole and a plurality of longitudinally extending slots therein adjacent said cavity to form an expansible portion, a connecting portion on said bolt opposite said expansible portion, a plurality of wedges received within said grooves and with the bottom of said cavity to hold said expansible portion against said cavity, a filler material in said cavity, and a reinforcing member in said bore abutting said filler material and having substantially the same diameter as said bore.

2. A method of constructing an anchor assembly comprising the steps of: drilling an elongated hole in a supporting structure, forming an enlarged cavity in the bottom of the hole, driving a bolt having a longitudinally extending bore and a diameter substantially equal to the hole into the hole, expanding the end of the bolt against the enlarged cavity, supplying a filler material through the bore of the bolt into the cavity, and inserting a reinforcing member into the bore of the bolt so as to abut the filler material.

References Cited

UNITED STATES PATENTS

| 747,219 | 12/1903 | Preslar | 61—45 X |
| 2,667,037 | 1/1954 | Thomas et al. | 61—45 |

FOREIGN PATENTS 825,003   12/1959   Great Britain.

JACOB SHAPIRO, *Primary Examiner.*